United States Patent [19]

Kobayashi et al.

[11] Patent Number: 4,779,342
[45] Date of Patent: Oct. 25, 1988

[54] HAND-OPERATED CABLE CUTTER WITH GEAR DRIVE

[75] Inventors: Sadaichi Kobayashi; Teizo Kobayashi; Mituharu Kobayashi, all of Sanjo, Japan

[73] Assignee: Kobayashi Tools Mfg., Co. Ltd., Niigata, Japan

[21] Appl. No.: 79,504

[22] Filed: Jul. 30, 1987

[30] Foreign Application Priority Data

Aug. 9, 1986 [JP] Japan .................................. 61-187560
Aug. 9, 1986 [JP] Japan .................................. 61-187561

[51] Int. Cl.$^4$ .......................................... B26B 13/00
[52] U.S. Cl. .......................................... 30/250; 30/192
[58] Field of Search ..................... 30/92, 192, 250, 251; 81/314, 325, 366

[56] References Cited

U.S. PATENT DOCUMENTS

| | | | |
|---|---|---|---|
| 3,210,844 | 10/1965 | Tontscheff | 30/250 |
| 4,223,439 | 9/1980 | Rommel | 30/250 |
| 4,378,636 | 4/1983 | Wick | 30/250 |
| 4,677,748 | 7/1987 | Kobayashi | 30/250 |

Primary Examiner—Douglas D. Watts
Attorney, Agent, or Firm—Wenderoth, Lind and Lind

[57] ABSTRACT

A hand-operated cable cutter includes a rotary blade-rotating mechanism comprising a first pinion and a gear which are provided on the side of a stationary handle and a second pinion which is provided on the side of a movable handle, a ratchet lever, and a detent pawl. The ratchet lever and detent pawl are operated to be switched between their respective different states relative to the second pinion, thereby enabling a rotary blade not only in the direction of cutting off a cable but also in the direction of releasing the cable.

6 Claims, 9 Drawing Sheets

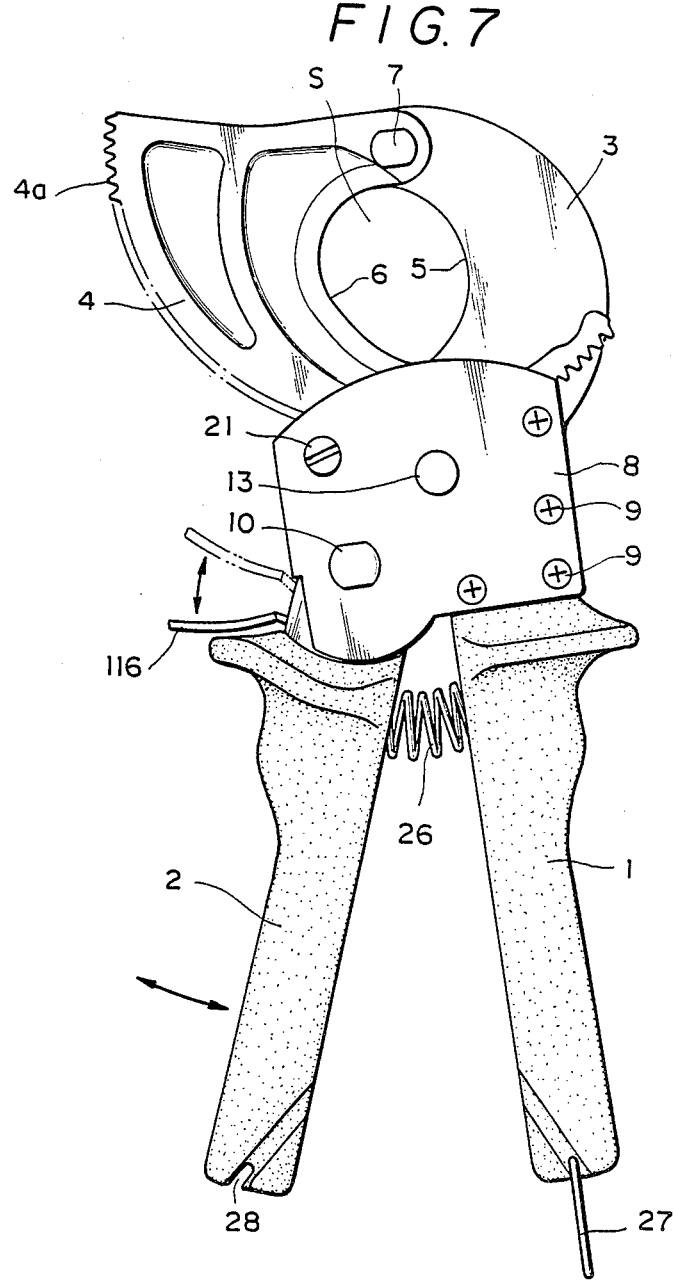

HAND-OPERATED CABLE CUTTER WITH GEAR DRIVE

BACKGROUND OF THE INVENTION AND RELATED ART STATEMENT

The present invention relates to a hand-operated cable cutter capable of easily cutting off wire ropes, electric wires, communications lines, reinforced bars or other metallic cables.

For example, U.S. Pat. No. 4,223,439 discloses a cable cutter of this type. The conventional cable cutter comprises a stationary handle and a movable handle which are joined together at their respective upper portions and biased in a direction of one away from the other by a spring, a stationary blade having the base portion thereof fixed to the upper portion of the stationary handle, a rotary blade having the base portion thereof attached pivotally to the leading end of the stationary blade and also having the outer arcuate side surface formed with continuous teeth, and an operation lever pivotally attached to the upper portion of the movable handle and provided with an engaging claw for engagement with the teeth of the rotary blade, whereby the opening and closing operation of the movable handle relative to the stationary handle moves the operation lever to rotate the rotary blade having the teeth thereof kept in engagement with the engaging claw in the closing direction, i.e. in the direction of cutting a cable or the like.

In actual use of the conventional cable cutter, a cable or the like is placed in a space defined by the stationary blade and the rotary blade, then the free end of the rotary blade is rotated about the pivot to be guided in the closing direction, thereby surrounding the outer periphery of the cable or the like by the stationary and rotary blades, and thereafter the movable handle is continuously operated to alternately close and open relative to the stationary handle. By effecting the continuous operation of the movable handle, which causes the engaging claw of the operation lever to repeat its action of idly sliding over one of the teeth and engaging with the adjacent one of the teeth, until the aforementioned space becomes zero, the cable or the like can be cut off with the opposed cutting edges of the stationary and rotary blades.

In the conventional cable cutter, the base portion of the rotary blade is pivotally attached to the upper portion of the stationary blade. In other words, the pivot portion for the two blades is located at the uppermost position of the cable cutter. Since this construction makes it possible to cut off a cable or the like in the state of being completely surrounded by the two blades, the conventional cable cutter can advantageously be used in cutting off cables of a relatively large diameter. Further, when attention is paid only to the cable cutting operation of moving the rotary blade in the closing direction in conjunction with the opening and closing operation of the moveable handle, the conventional cable cutter utilizes the operation lever pivotally attached to the moveable handle as means for moving the rotary blade in the closing direction. This operation lever constitutes a so-called toggle mechanism in cooperation with the place where the two blades are pivotally attached to each other and the place where the two handles are joined together. The adoption of the toggle mechanism has a merit in that a small force can give a large shearing force to the rotary blade, whereas it has a demerit in that it is impossible to move the rotary blade in the opening direction during the cable cutting operation.

Depending on the relationship between the cutting ability of a cable cutter and the hardness and diameter of a cable to be cut off, after the cutting edges have bitten into the cable, there has been a fair possibility of the rotary blade being incapable of rotating in the closing direction even by repeatedly operating the movable handle. However, none of the conventional cable cutters has a structure capable of easily solve such an accidental problem, i.e. a structure for forcibly moving the rotary blade in the opening direction and easily removing the cable. This is the most significant problem in using the conventional cable cutters. Some of the conventional cable cutters have a mechanism for releasing the engagement between the engaging claw of the operation lever and the teeth of the rotary blade. However, this releasing mechanism functions not as means for forcibly moving the rotary blade in the opening direction during the cable cutting operation, but as means for moving in the opening direction the rotary blade kept only in the state after the termination of or before the beginning of the cable cutting operation. For this reason, in the case where such an accident as described above arises, i.e. where the cutting edge of the rotary blade has bitten deeply into the cable, even though the engaging claw of the operation lever can be brought to a state of disengaging from the teeth, it is impossible to rotate the rotary blade in the opening direction only with the force of the hand and, what is worse, dangerous work is required in such a rotating operation.

OBJECT AND SUMMARY OF THE INVENTION

The main object of the present invention is to provide a hand-operated cable cutter capable of solving the significant problem encountered by the conventional cable cutters during the operation thereof, specifically capable of rotating a rotary blade in a reverse direction with a very easy and safe operation even in the case where there occurs during a cable cutting operation such an accident as making it impossible to continue the cable cutting operation.

To attain the object described above, according to the present invention, there is provided a hand-operated cable cutter comprising in combination a pair of stationary and movable handles having respective upper portions joined together and being biased by a spring so that one is away from the other, a stationary blade having an inner cutting edge and a base which is fixed to the upper portion of the stationary handle, a rotary blade having an inner cutting edge and outer teeth continuously arranged arcuately, and also having a base pivotally attached to the leading end of the stationary blade, a shaft provided on the side of the stationary handle, a first pinion for mesh with the outer teeth of the rotary blade and a gear which are coaxially supported about the shaft, a second pinion provided on the side of the movable handle for mesh with the gear, a ratchet lever capable of being switched between an engaged state and a neutral state relative to the second pinion and, in the engaged state, capable of rotating the second pinion with the moving of the movable handle in the directions close to and away from the stationary handle, the rotation of the second pinion being transmitted to the gear, then to the first pinion and finally to the rotary blade, thereby rotating the rotary blade in a direction of cutting off a cable, a detent pawl capable of being switched between an engaged state and a neutral state relative to the second pinion and, in the engaged state, capable of preventing the second pinion from reverse rotation, and a knob integrally fixed to the shaft for enabling the rotary blade to be rotated in the direction of cutting off a cable when the ratchet lever is kept in the neutral state relative to the second pinion and, when the ratchet lever and the detent pawl are kept in their respective neutral states relative to the second pinion, enabling the rotary blade to be rotated in the directions of cutting off and releasing a cable.

Furthermore, according to the present invention, there is provided a hand-operated cable cutter including a ratchet lever capable of being switched between two engaged state relative to the second pinion and operated with the moving of the movable handle in the directions close to and away from the stationary handle so that the ratchet lever kept in one of the two states permits the second pinion to be rotated in one direction and so that the ratchet lever kept in the other state permits the second pinion to be rotated in the other direction when the detent pawl is kept in the neutral state, the rotation of the second pinion in any of the two directions being transmitted to the gear, then to the first pinion and finally to the rotary blade, thereby enabling the rotary blade to be rotated in the directions of cutting off and releasing a cable.

The above and other objects, characteristic features and advantages of the present invention will become more apparent to those skilled in the art as the disclosure is made in the following description of preferred embodiments of the invention, as illustrated in the accompanying drawings.

BRIEF DESCRIPTION OF THE DRAWINGS

FIG. 7 is a front view illustrating a second embodiment of the hand-operated cable cutter according to the present invention.

DETAILED DESCRIPTION OF THE PREFERRED EMBODIMENTS

Figure 1:
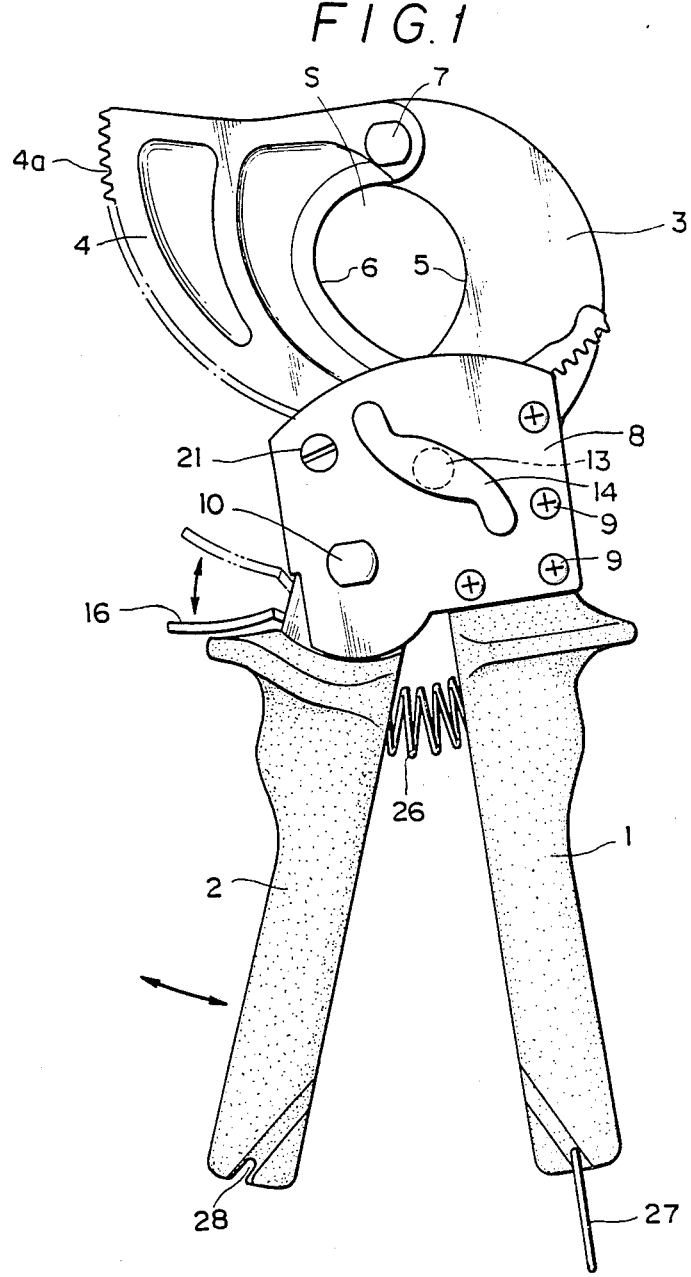
FIG. 1 is a front view illustrating one embodiment of the hand-operated cable cutter according to the present invention.

The present invention will now be described in detail with reference to the illustrated embodiments.

FIG. 1 to FIG. 5 illustrate one embodiment of the handoperated cable cutter according to the present invention. This cable cutter comprises a stationary handle 1, a movable handle 2 biased in a direction away from the stationary handle 1 by a coil spring 26, a stationary blade 3 having a wide base 3a and an inner cutting edge 5, a rotary blade 4 having outer teeth 4a continuously arranged arcuately and an inner cutting edge 6 and having a base pivotally attached to the leading end of the stationary blade 3 by a pivot 7, and a rectangular cover plate 8 having a bent wall 8a and serving to make the stationary and movable handles 1 and 2 integral with each other in cooperation with the wide base 3a of the stationary blade 8.

In a state of the cover plate 8 and the wide base 3a of the stationary blade 3 sandwiching the upper end portions of the stationary and movable handles 1 and 2 therebetween, they are joined together by means of screw fittings 9 on the side of the stationary handle 1 and also by means of a pivot shaft 10 on the side of the movable handle 2. Thus, the stationary handle 1 is fixed at the upper end portion thereof between the cover plate 8 and the wide base 3a by means of the screw fittings 9, whereas the movable handle 2 biased in the direction away from the stationary handle 1 by the coil spring 26 has the upper end portion thereof interposed between the cover plate 8 and the wide base 3a and is movable about the pivot shaft 10 toward the stationary handle 1 against the biasing force of the coil spring 26 and away from the stationary handle 1 with the aid of the biasing force of the coil spring 26. The stationary blade 3 having the wide base thereof fixed to the stationary handle 1 by means of the screw fittings 9 and the rotary blade 4 having the base attached pivotally to the leading end of the stationary blade 3 by the pivot 7 are adapted to completely surround a cable or the like (not shown) and cut off the cable or the like with the respective inner cutting edges 5 and 6.

The cover plate 8 and the wide base 3a of the stationary blade 3 are also joined together by a shaft 13 which is located at a position nearer on the stationary handle side than on the movable handle side and projects outwardly from the cover plate 8. Around the portion of the shaft 13 disposed between the cover plate 8 and the wide base 3a there are coaxially rotatably mounted a first pinion 11 held in direct mesh with the teeth 4a of the rotary blade 4 and a gear 12. On the projecting end of the shaft 13 there is integrally mounted a knob 14 manually enabling the rotary blade 4 to be forcibly rotated in either directions not under the operation of the movable handle 2 but under specific conditions which will be described later.

Figure 4:
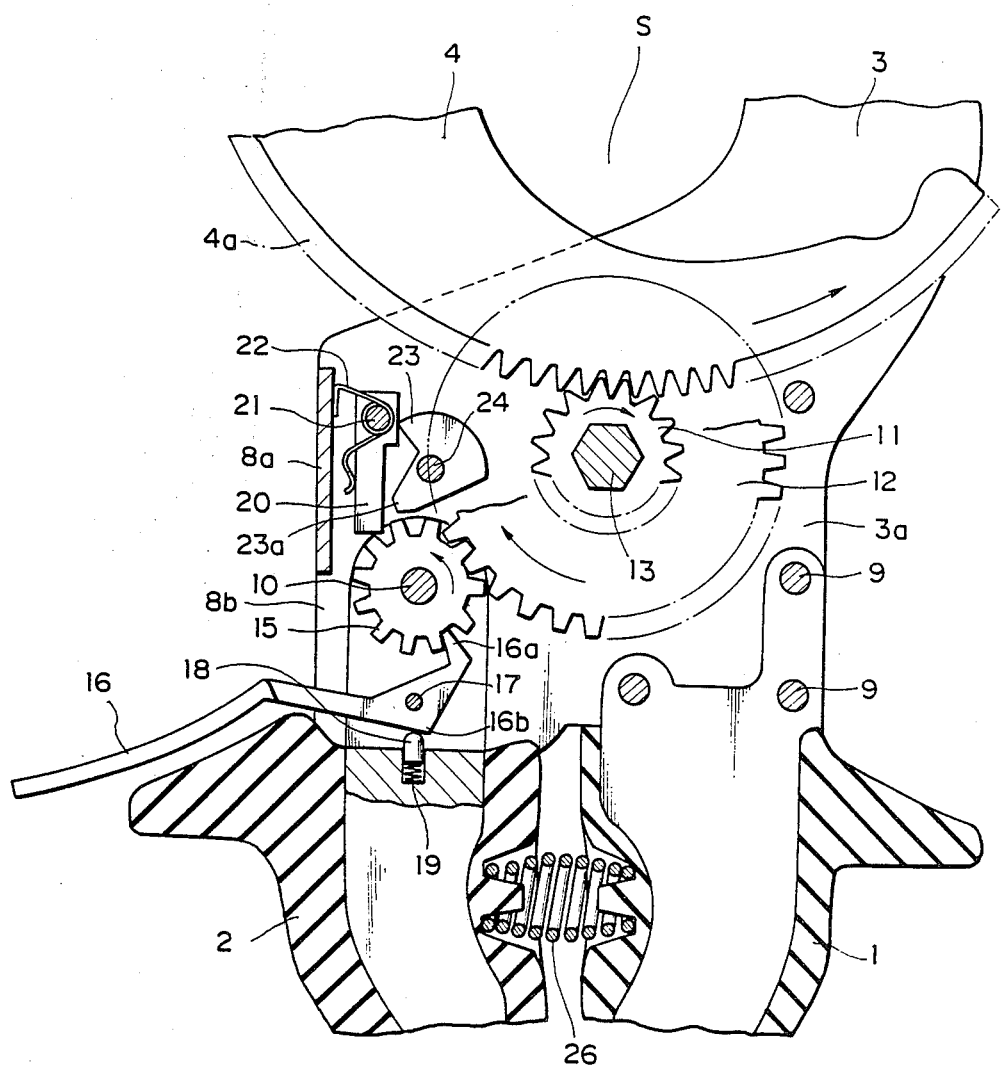
FIG. 4 is an enlarged cross section illustrating the principal part of the same embodiment, in which a ratchet lever and a detent pawl are held in their respective engaged states.
Figure 5:
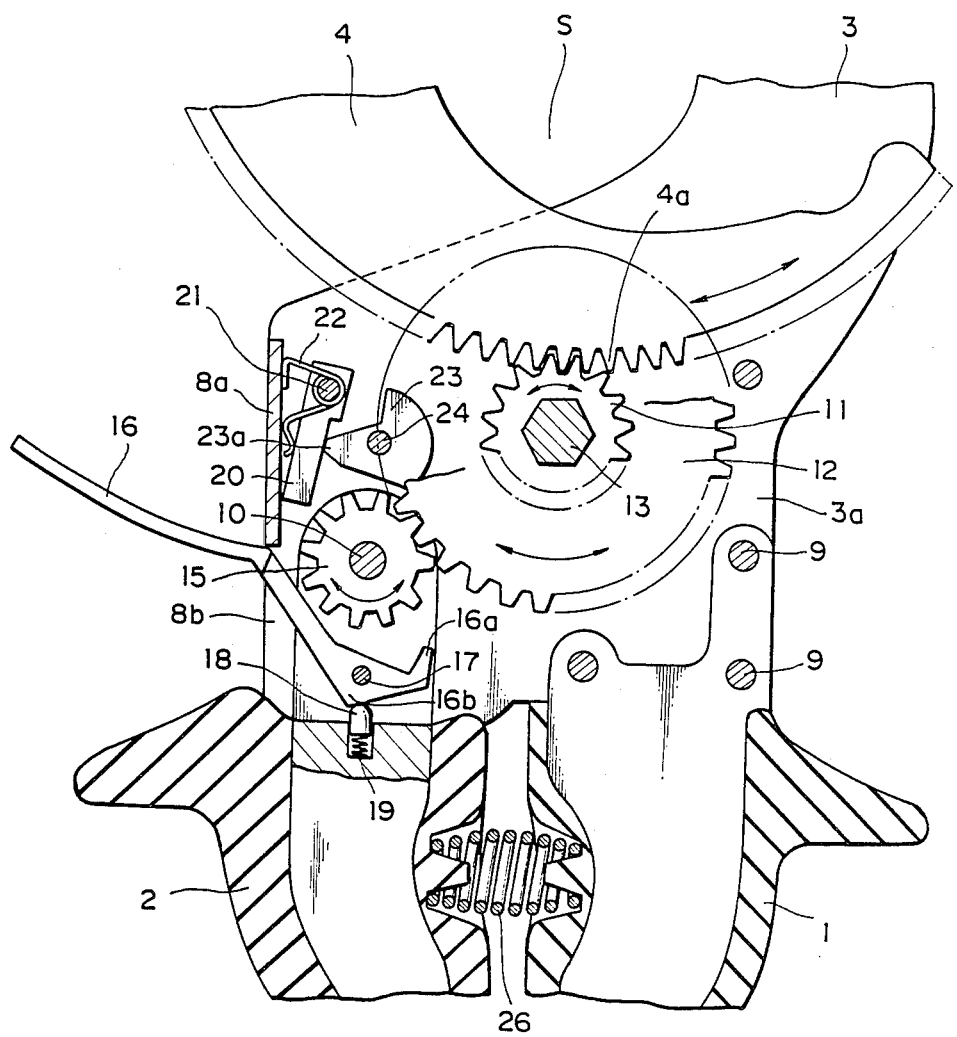
FIG. 5 is an enlarged cross section illustrating the principal part of the same embodiment, in which the ratchet lever and the detent pawl are held in their respective neutral states.

The upper end portion of the movable handle 2 interposed between the cover plate 8 and the wide base 3a of the stationary blade 3 is provided with a second pinion 15 rotatably mounted around the pivot shaft 10 and kept in mesh with the gear 12 around the shaft 13 and is also provided with a ratchet lever 16 capable of being changed over between engaged and neutral states relative to the second pinion 15. As is best shown in FIGS. 4 and 5, the ratchet lever 16 is pivotally supported around a support pin 17, and has one end thereof projecting outwardly from a notch 8b formed in the bent wall 8a of the cover plate 8 so that the ratchet lever 16 can be operated at the projecting one end and also has the other end thereof formed integrally with a pawl 16a capable of engaging with and disengaging from the second pinion 15. The portion of the ratchet lever 16 in the vicinity of the support pin 17 is formed with a lug 16b which is biased toward the support pin 17 by a bearing 18 and a spring 19 provided within the movable handle 2 and cooperating with each other. When the ratchet lever 16 is operated to cause the bearing 18 to abut against one side of the lug 16b, as illustrated in FIG. 4, the pawl 16a is engaged with the second pinion 15. At this time, the ratchet lever 16 is in the engaged state relative to the second pinion 15. When the ratchet lever 16 is operated to cause the bearing 18 to abut against the other side of the lug 16b, as illustrated in FIG. 5, the pawl 16a is disengaged from the second pinion 15. At this time, the ratchet lever 16 is in the neutral state relative to the second pinion 15.

The cover plate 8 and the wide base 3a of the stationary blade 3 are further joined together by a pivot pin 21 disposed above the pivot shaft 10. Around the portion of the pivot pin 21 between the cover plate 8 and the wide base 3a there is pivotally mounted a detent pawl 20 serving to prevent the second pinion 15 from reverse rotation when it is engaged with the second pinion 15. A tension spring 22 is wound about the aforementioned portion of the pivot pin 21 and disposed between the bent wall 8a of the cover plate 8 and the detent pawl 20 so that it biases the detent pawl 20 in the direction of engagement with the second pinion 15 at all times, as illustrated in FIG. 4. In the vicinity of the detent pawl 20 there is provided a rotor 23 having an operation end 23a and pivotally mounted around a spindle 24. The portion of the spindle 24 projecting outwardly from the wide base 3a of the stationary blade 3 is provided integrally with an operation lever 25 for rotating the rotor 23 in a desired direction. With the operation of the operation lever 25 to rotate the operation end 23a of the rotor 23 about the spindle 24 in the direction away from the side surface of the detent pawl 20, the detent pawl 20 is biased by the torsion spring 22 to engage with the second pinion 15 as illustrated in FIG. 4 and, in this state, the detent pawl 20 permits the second pinion to be rotated in a state of idly sliding over the detent pawl 20 in the direction indicated by the arrow in FIG. 4. The operation of the operation lever 25 in the reverse direction causes the operation end 23a of the rotor 23 to push the detent pawl 20 against the biasing force of the tension spring 22 as illustrated in FIG. 5. As a result, the detent pawl 20 is disengaged from the second pinion 15 and consequently the detent pawl 20 is brought to its neutral state relative to the second pinion 15.

Figure 2:
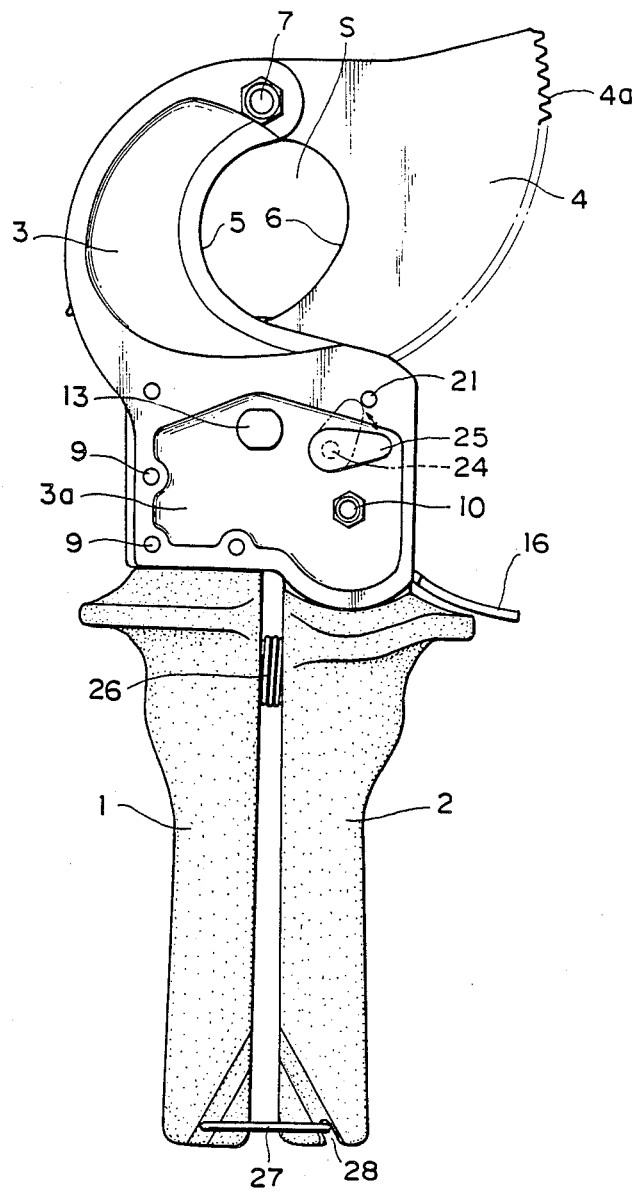
FIG. 2 is a rear view illustrating the same embodiment.
Figure 3:
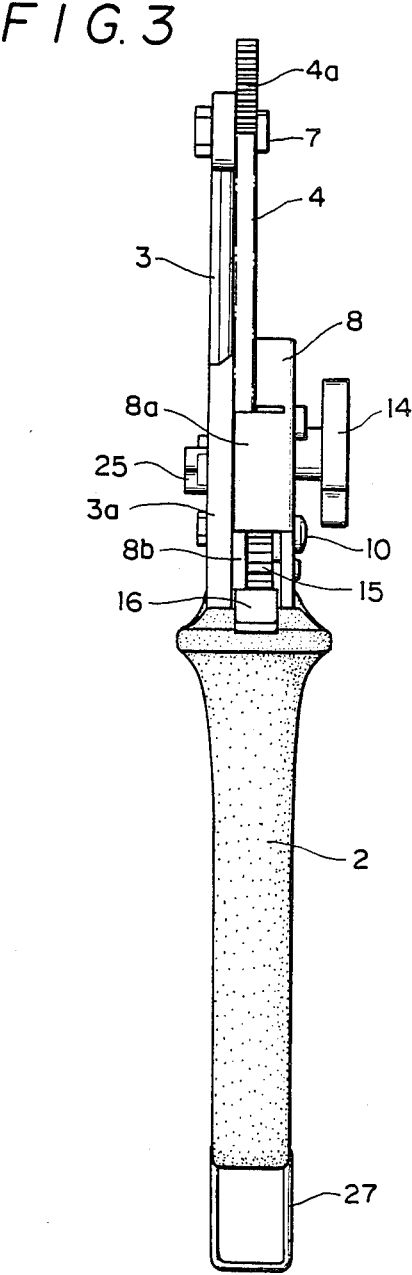
FIG. 3 is a left side view illustrating the same embodiment.

When the ratchet lever 16 is switched from the engaged state to the neutral state and, at the same time, the detent pawl 20 is also brought to the neutral state, not only the second pinion 15 but also the gear 12 and first pinion 11 can freely be rotated in either directions. In this state, manual rotation of the knob 14 in a desired direction rotates the first pinion 11 in the same direction. Thus, the rotary blade 4 can be forcibly rotated in either directions by the rotation of the knob 14 without depending on the operation of the movable handle 2 relative to the stationary handle 1. Returning to FIGS. 1 and 2, reference numeral 27 designates a lock member provided on the lower end of the stationary handle 1 and numeral 28 a lock groove formed in the lower end of the movable handle 2. The hand-operated cable cutter is kept in the state of non-use by moving the movable handle 2 toward the stationary handle 1 against the biasing force of the coil spring 26 and then engaging the lock member 27 in the lock groove 28 as illustrated in FIG. 2.

In cutting off a cable or the like with the hand-operated cable cutter having the aforementioned construction, at first the operation lever 25 is operated to cause the operation end 23a of the rotor 23 to be separated from the side surface of the detent pawl 20, thereby bringing the detent pawl 20 into engagement with the second pinion 15, and the ratchet lever 16 is operated to cause the pawl 16a thereof to engage with the second pinion 15. In this state, i.e. in the state of FIG. 4, a cable or the like is placed in a space S defined by the inner cutting edges 5 and 6 of the stationary and rotary blades 3 and 4, and the leading end of the rotary blade 4 is guided in between the cover plate 8 and the wide base 3a of the stationary blade 3 by operating the movable handle 2 to be continuously moved toward and away from the stationary handle 1. Cne cycle of the closing and opening movement of the movable handle 2 relative to the stationary handle 1 can rotate the second pinion 15 in the direction indicated by the arrow in FIG. 4 by an amount corresponding to one tooth of the second pinion 15 by the action of the pawl 16a of the ratchet lever 16. In this operation, the opening movement of the movable handle 2 causes the pawl 16a of the ratchet lever 16 to idly slide over the second pinion 15, whereas the closing movement thereof causes the pawl 16a to push the second pinion 15. Further, in this operation, the second pinion 15 is prevented from reverse rotation by means of the detent pawl 20 held in engagement with the second pinion 15.

Repeated operation of the movable handle 2 rotates the second pinion 15 and then rotates not only the gear 12 but also the first pinion 11 in the respective directions indicated by the arrows in FIG. 4. As a result, the rotary blade 4 having the outer teeth 4a meshed with the first pinion 11 is moved in the direction of reducing the area of the space S. Consequently, the cable or the like surrounded by and brought into contact with the inner cutting edges 5 and 6 of the stationary and rotary blades 3 and 4 can easily be cut off.

Further, if the ratchet lever 16 is constructed such that it can abut against the lower end of the bent wall 8a of the cover plate 8 when the movable handle 2 has been opened to the fullest extent relative to the stationary handle 1, the initial opening operation of the movable handle 2 enables the ratchet lever 16 to be automatically switched to the engaged state. In this case, however, the switching of the ratchet lever 16 from the engaged state to the neutral state has to be effected manually. The rotary blade 4 is rotated by manually operating the knob 14 until it comes into contact with the outer periphery of a cable, with the ratchet lever 16 kept in the neutral state while grasping the stationary and rotary handles 1 and 2 kept in their closed state. Then, the movable handle 2 is opened to the fullest extent relative to the stationary handle 1, with the result that the ratchet lever 16 abuts against the lower end of the bent wall 8a of the cover plate 8 to be switched to the engaged state relative to the second pinion 15. In this state, the movable handle 2 is repeatedly closed and opened relative to the stationary handle 1 to cut off the cable.

In the case where any accident occurs in the course of the cutting operation to make it impossible to continue the cutting operation, the ratchet lever 16 is switched to the neutral state and, at the same time, the operation lever 25 is rotated to push the rotor 23 against the detent pawl 20, thereby switching the detent pawl 20 to the neutral state. As a result, the first pinion 11, gear 12 and second pinion 15 are brought to the state of being freely rotated in either directions indicated by the arrows in FIG. 5. Therefore, by manually rotating the knob 14 fixed to the shaft 13 in the counterclockwise direction in FIG. 1, the first pinion 11 inserted around the shaft 13 is forcibly rotated in the same direction, whereas the rotary blade 4 having the outer teeth 4a meshed with the first pinion is forcibly rotated in the clockwise direction in FIG. 5. Thus, the cable under treatment can be released from between the stationary and rotary blades 3 and 4 to easily cope with the accident. Since the rotary blade 4 can be rotated in the reverse direction by the rotating operation of the knob, i.e. mechanically, the rotary blade-releasing work can safely be carried out with ease.

Figure 6A:
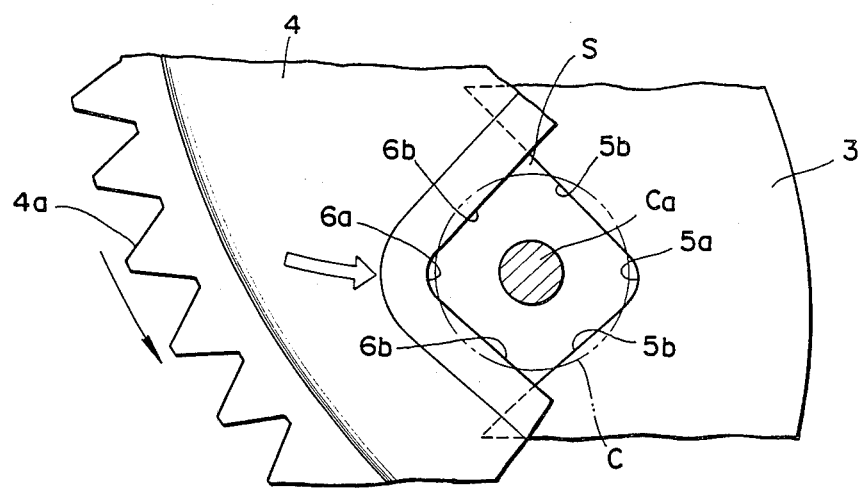
FIG. 6A is an enlarged explanatory view illustrating another example of the shape of inner cutting edges of stationary and rotary blades.
Figure 6B:
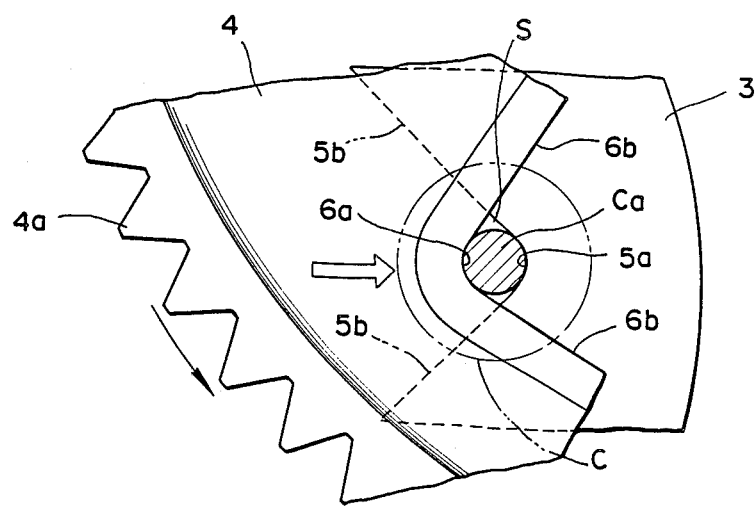
FIG. 6B is an enlarged explanatory view illustrating a cable being cut with the inner cutting edges of FIG. 6A.

In the embodiment shown in FIG. 1 to FIG. 5, the inner cutting edges 5 and 6 of the stationary and rotary blades 3 and 4 are formed arcuately as shown. However, this is by no means limitative. For example, they may be formed in a substantially V-shape as shown in FIGS. 6A and 6B. In this example, each of the cutting edges 5 and 6 has a bottom 5a or 6a disposed on a circle described with the pivot 6 as the center and opposite sides 5b or 6b formed substantially straight. A cable C is cut gradually at the periphery thereof with the substantially straight sides 5b and 6b of the inner cutting edges 5 and 6 and finally at the core Ca thereof with the bottoms 5a and 6a into which a cable-shearing force is concentrated. With this structure, therefore, even an ACSR (aluminum cable steel-reinforced) can easily be cut off. Thus, the shape of the inner cutting edges 5 and 6 should be determined in accordance with the kind of a cable to be cut off.

Figure 8:
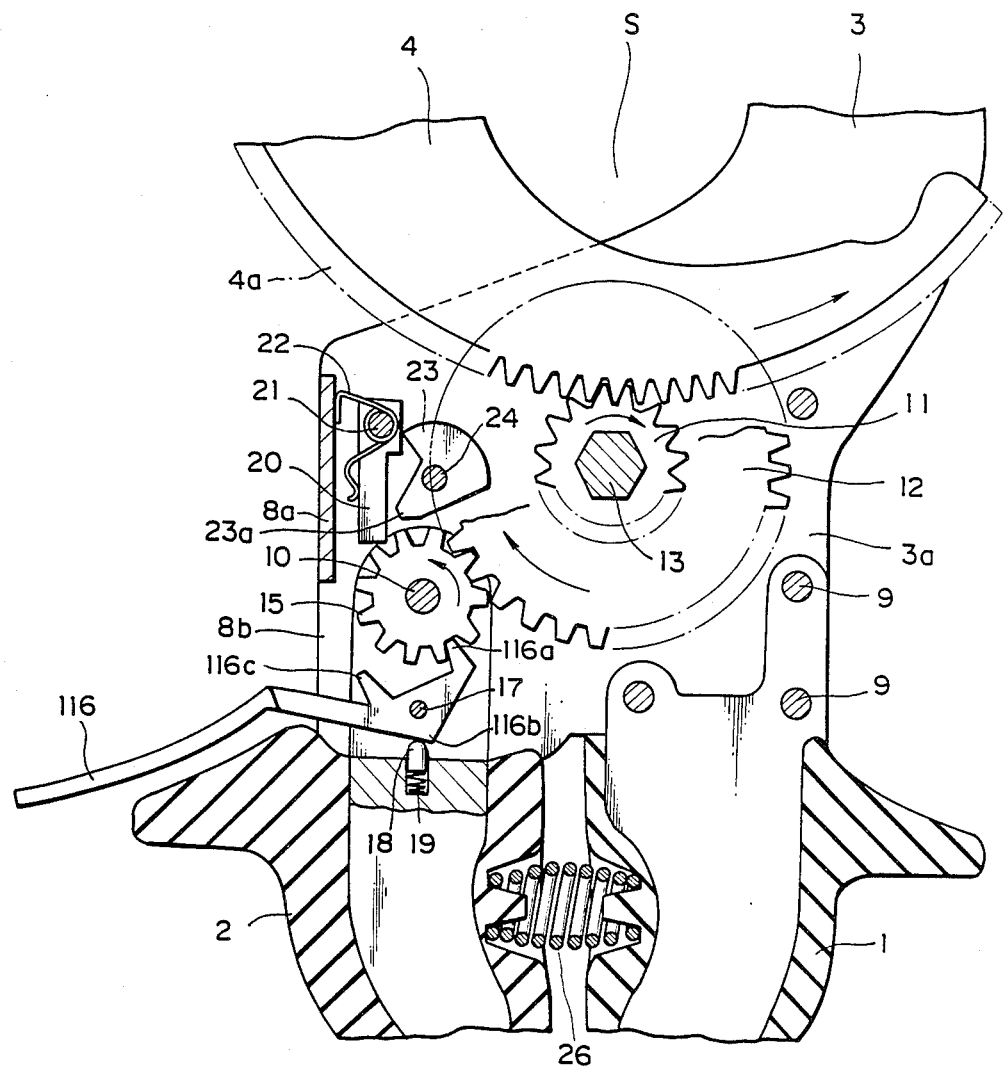
FIG. 8 is an enlarged cross section illustrating the principal part of the second embodiment, in which a ratchet lever is held in one engaged state and a detent pawl is held in the engaged state.
Figure 9:
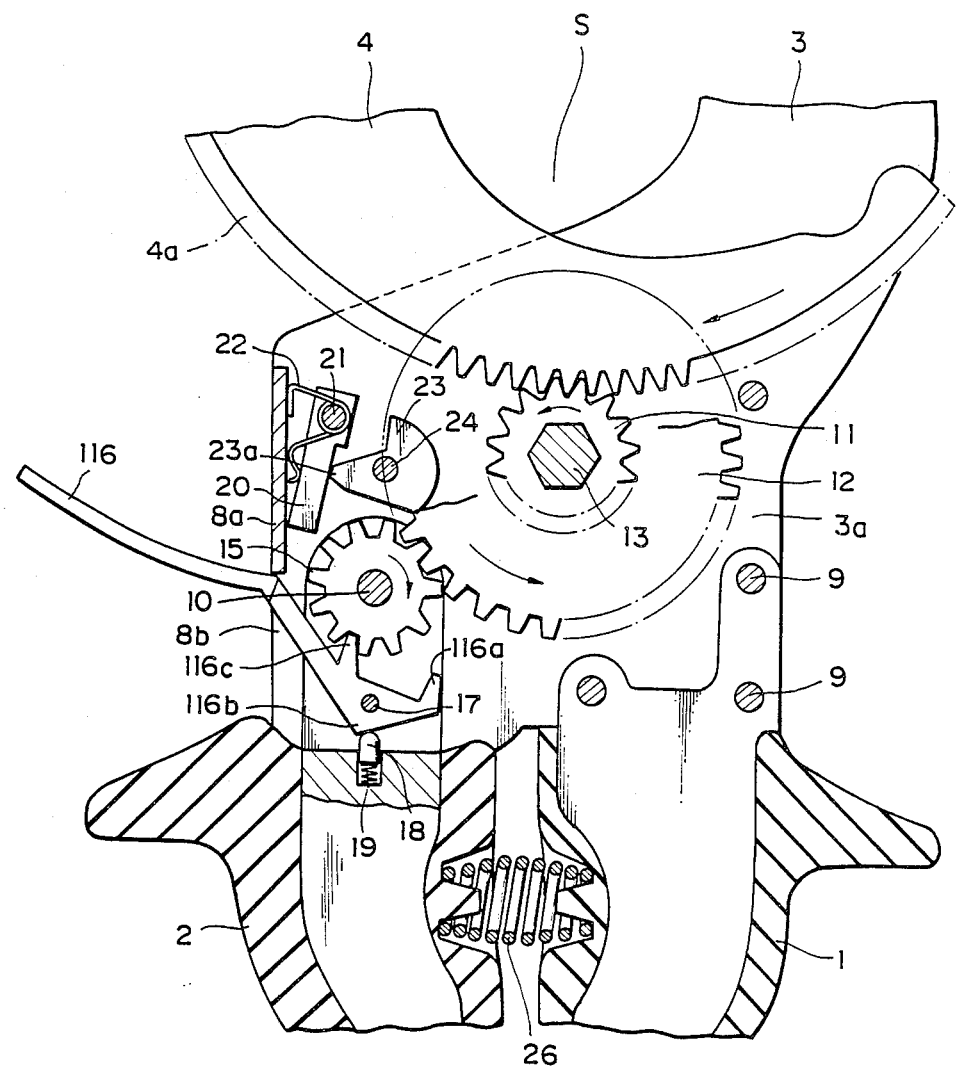
FIG. 9 is an enlarged cross section illustrating the principal part of the second embodiment, in which the ratchet lever is held in the other engaged state and the detent pawl is held in the neutral state.

FIG. 7 to FIG. 9 illustrate the second embodiment of the hand-operated cable cutter according to the present invention. The portions and elements identical with those of the preceding embodiment are indicated by the same reference numerals as used in FIG. 1 to FIG. 5, and the description thereof is omitted in the following.

In the second embodiment, both normal and reverse rotations of the rotary blade 4 are attained by the opening and closing operation of the movable handle 2 relative to the stationary handle 1 while in the preceding embodiment the reverse rotation of the rotary blade 4 is accomplished by the rotating operation of the knob 14. As shown in FIG. 7, the knob 14 integrally fixed to the shaft 13 around which the first pinion 11 and gear 12 are fitted in the preceding embodiment, has been omitted in the second embodiment and instead, as shown in FIGS. 8 and 9, a ratchet lever 116 capable of being switched between two different engaged states relative to the second pinion 15 is adopted. The rotary blade 4 can be rotated in the normal direction by the repeated operation of the movable handle 2 when the ratchet lever 116 is kept in one of the two engaged states and can also be rotated in the reverse direction by the same repeated operation when the ratchet lever 116 is kept in the other engaged state.

To be specific, the ratchet lever 116 is pivotally supported around the support pin 17 and has one end thereof projecting outwardly from the notch 8b formed in the bent wall 8a of the cover plate 8 so that the ratchet lever 116 can be operated at the projecting one end, similarly to the ratchet lever 16 of the preceding embodiment. The portion of the ratchet lever 116 in the vicinity of the support pin 17 is provided on one side thereof integrally with first and second pawls 116a and 116c which are each capable of engaging with and disengaging from the second pinion 15 and on the other side thereof integrally with a lug 116b which is biased toward the support pin 17 by the bearing 18 and the spring 19 provided within the movable handle 2 and cooperating with each other. The first and second pawls 116a and 116c are located at a predetermined distance while interposing the support pin 17 therebetween, and provide two different engaged states of the ratchet lever 116 relative to the second pinion 15. Specifically, when the latchet lever 116 is operated to cause the bearing 18 to abut against one side of the lug 116b as illustrated in FIG. 8, the first pawl 116a alone is engaged with the second pinion 15, whereas the second pawl 116c alone is engaged with the second pinion 15 when the latchet lever 116 is operated to cause the bearing 18 to abut against the other side of the lug 116b as illustrated in FIG. 9. Thus, the ratchet lever 116 is switched between the two different engaged states relative to the second pinion 15.

In the state of engagement between the first pawl 116a and the second pinion 15, one cycle of the closing and opening movement of the movable handle 2 relative to the stationary handle 1 can rotate the second pinion 15 in the direction indicated by the arrow in FIG. 8 by an amount corresponding to one tooth of the second pinion 15 by the action of the first pawl 116a of the ratchet lever 116. In this operation, the opening movement of the movable handle 2 causes the first pawl 116a of the ratchet lever 116 to idly slide over the second pinion 15, whereas the closing movement thereof causes the first pawl 116a to push the second pinion 15.

On the other hand, in the state of engagement between the second pawl 116c and the second pinion 15, the closing movement of the movable handle 2 causes the second pawl 116c to idly slide over the second pinion 15, whereas the opening movement thereof causes the second pawl 116c to push the second pinion 15 in the direction indicated by the arrow in FIG. 9.

In cutting off a cable or the like with the hand-operated cable cutter having the ratchet lever 116 of the aforementioned construction, at first, the detent pawl 20 is switched to the engaged state relative to the second pinion 15, the ratchet pawl 116 is switched so that the first pawl 116a thereof is engaged with the second pinion 15, the cable or the like is set in position in the space S defined by the stationary and rotary blades 3 and 4, and the leading end of the rotary blade 4 is guided in between the cover plate 8 and the wide base 3a of the stationary blade 3 to completely surround the periphery of the cable or the like. Then, the movable handle 2 is continuously moved toward and away from the stationary handle 1. As a result, the second pinion 15 is rotated by the first pawl 116a of the ratchet lever 116 in the normal direction indicated by the arrow in FIG. 8. The rotation of the second pinion 15 is transmitted to the gear 12 and first pinion 11 which are fitted around the shaft 13 and to the rotary blade 4 having the outer teeth 4a kept in mesh with the first pinion 11. Therefore, the rotary blade 4 is moved in the normal direction, i.e. in the direction of reducing the area of the space S. Consequently, the cable or the like surrounded by and brought into contact with the inner cutting edges 5 and 6 of the stationary and rotary blades 3 and 4 can easily be cut off.

In the case where any accident occurs in the course of the cutting operation to make it impossible to continue the cutting operation, the operation lever 25 is rotated to push the rotor 23 against the detent pawl 20, thereby switching the detent pawl 20 to the neutral state in which the second pinion 15, gear 12 and first pinion 11 are brought to the state of being freely rotated. Thereafter, the ratchet lever 116 is switched so that the second pawl 116c is engaged with the second pinion 15. In this state, when the movable handle 2 is repeatedly moved toward and away from the stationary handle 1, the second pinion 15 is rotated by the action of the second pawl 116c of the ratchet lever 116 in the reverse direction indicated by the arrow in FIG. 9. The rotation of the second pinion 15 is transmitted to the gear 12 and first pinion 11 which are fitted coaxially around the shaft 13 and to the rotary blade 4 having the outer teeth 4a thereof kept in mesh with the first pinion 11. Therefore, the rotary blade 4 is rotated in the reverse direction, i.e. in the direction of increasing the area of the space S as shown by the arrow in FIG. 9. Consequently, the cable or the like having undergone such an accident can easily be removed from between the stationary and rotary blades 3 and 4. Since the second embodiment makes it possible to rotate the rotary blade 4 normally and reversely by the same operation of opening and closing the movable handle 2 relative to the stationary handle 1, as described above, the work required in the second embodiment at the time of such an accident as making it impossible to continue the cutting operation is safer and easier than that required in the preceding embodiment which relies on the rotation operation of the knob 14.

As has been described in the foregoing, the present invention is characterized by providing on the stationary handle side the first pinion snugly fitted about the shaft for coming into mesh with the outer teeth of the rotary blade and the gear snugly fitted about the shaft coaxially with the first pinion and providing on the movable handle side the second pinion kept in mesh with the gear, the ratchet lever capable of being switched between the two different states relative to the second pinion and the detent pawl capable of being switched between the engaged state and the neutral state relative to the second pinion. Therefore, any kind of metallic cable can easily be cut off with the stationary and rotary blades by continuously operating the movable handle relative to the stationary handle after the ratchet lever and detent pawl have been switched to the respective predetermined states.

When such an accident as making it impossible to continue the cutting operation occurs in the course of the cutting operation of the hand-operated cable cutter having the ratchet lever capable of being switched between the engaged state and the neutral state relative to the second pinion, the ratchet lever and detent pawl are switched to their respective neutral states relative to the second pinion and then the knob is manually operated to forcibly rotate the rotary blade in the cable-releasing direction. The cable under treatment can easily be released from between the two blades in this way. Where there is adopted the ratchet lever having the first pawl engaged with the second pinion when the rotary blade is to be rotated in the normal direction and having the second pawl engaged with the second pinion when the rotary blade is to be rotated in the reverse direction, the aforementioned accident can easily be coped with by switching the ratchet lever so that the second pawl is engaged with the second pinion, switching the detent pawl to the neutral state relative to the second pinion, and repeatedly moving the movable handle toward and away from the stationary handle, thereby forcibly rotating the rotary blade in the cable-releasing direction without use of the aforementioned knob. Therefore, the cable can similarly be released from between the two blades with ease.

Thus, the present invention can provide hand-operated cable cutters capable of forcibly rotating the rotary blade in the reverse direction and advantageous in use.

Furthermore, since the present invention eliminates use of the conventional toggle mechanism and adopts the gear mechanism, forcible rotation of the rotary blade in the reverse direction has been realized for the first time. Owing to the adoption of the gear mechanism, a desired shearing force can freely be determined by suitably selecting the ratio in diameter among the first and second pinions and the gear and the number of teeth of the first and second pinions and the gear. In addition, the amount of rotation of the first and second pinions and the gear per cycle of the operation of the movable handle, i.e. the cut amount of the cable per the cycle, can freely be determined by suitably adjusting the amount of the intermittent feed of the second pinion.

What is claimed is:

1. A hand-operated cable cutter comprising in combination:
    a pair of stationary and movable handles having respective upper portions joined together and being biased by a spring so that one of them is away from the other,
    a stationary blade having an inner cutting edge and a base which is fixed to the upper portion of said stationary handle,
    a rotary blade having an inner cutting edge and outer teeth continuously arranged arcuately, and also having a base pivotally attached to the leading end of said stationary blade,
    a shaft provided on the side of said stationary handle,
    a first pinion for mesh with said outer teeth of said rotary blade and a gear which are coaxially supported about said shaft,
    a second pinion provided on the side of said movable handle for mesh with said gear,
    a ratchet lever capable of being switched between an engaged state and a neutral state relative to said second pinion and, in the engaged state, capable of rotating said second pinion with the moving of said movable handle in the directions close to and away from said stationary handle, the rotation of said second pinion being transmitted to said gear, then to said first pinion and finally to said rotary blade, thereby rotating said rotary blade in a direction of cutting off a cable.
    a detent pawl capable of being switched between an engaged state and a neutral state relative to said second pinion and, in the engaged state, capable of preventing said second pinion from reverse rotation, and
    a knob integrally fixed to said shaft for enabling said rotary blade to be rotated in the direction of cutting off the cable when said ratchet lever is kept in the neutral state relative to said second pinion and, when said ratchet lever and said detent pawl are kept in their respective neutral states relative to said second pinion, enabling said rotary blade to be rotated in the directions of cutting off and releasing the cable.

2. A hand-operated cable cutter according to claim 1, wherein said ratchet lever has a pawl for engagement with said second pinion.

3. A hand-operated cable cutter according to claim 1, wherein said detent pawl is biased by a spring at all times to be kept in the engaged state relative to said second pinion and can be switched into the neutral state relative to said second pinion by a rotor adapted to push said detent pawl away from said second pinion.

4. A hand-operated cable cutter comprising in combination:
- a pair of stationary and movable handles having respective upper portions joined together and being biased by a spring so that one of them is away from the other,
- a stationary blade having an inner cutting edge and a base which is fixed to the upper portion of said stationary handle,
- a rotary blade having an inner cutting edge and outer teeth continuously arranged arcuately, and also having a base pivotally attached to the leading end of said stationary blade,
- a shaft provided on the side of said stationary handle,
- a first pinion for mesh with said outer teeth of said rotary blade and a gear which are coaxially supported about said shaft,
- a second pinion provided on the side of said movable handle for mesh with said gear,
- a detent pawl capable of being switched between an engaged state and neutral state relative to said second pinion and, in the engaged state, capable of preventing said second pinion from reverse rotation, and
- a ratchet lever capable of being switched between two engaged states relative to said second pinion and operated with the moving of said movable handle in the directions close to and away from said stationary handle so that said ratchet lever kept in one of the two states permits said second pinion to be rotated in one direction and so that said ratchet lever kept in the other state permits said second pinion to be rotated in the other direction when said detent pawl is kept in the neutral state, the rotation of said second pinion in any of the two directions being transmitted to said gear then to said first pinion and finally to said rotary blade thereby enabling said rotary blade to be rotated in the directions of cutting off and releasing a cable.

5. A hand-operated cable cutter according to claim 4, wherein said ratchet lever has two pawls for engagement with said second pinion, one of said two pawls keeping said ratchet lever in one engaged state and the other pawl keeping said ratchet lever in the other engaged state.

6. A hand-operated cable cutter according to claim 4, wherein said detent pawl is biased by a spring at all times to be kept in the engaged state relative to said second pinion and can be switched into the neutral state relative to said second pinion by a rotor adapted to push said detent pawl away from said second pinion.

* * * * *